(12) United States Patent
Oh (10) Patent No.: US 6,460,789 B2
(45) Date of Patent: Oct. 8, 2002

(54) AUTOMATIC FOOD WASTE PROCESSING SYSTEM

(75) Inventor: Se-Heon Oh, Pusan (KR)

(73) Assignee: AT & G Co., Ltd., Incheon (KR)

( * ) Notice: Subject to any disclaimer, the term of this patent is extended or adjusted under 35 U.S.C. 154(b) by 0 days.

(21) Appl. No.: 09/740,015

(22) Filed: Dec. 20, 2000

(65) Prior Publication Data

US 2001/0022328 A1 Sep. 20, 2001

(30) Foreign Application Priority Data

Mar. 17, 2000 (KR) .......................... 2000-13740

(51) Int. Cl.⁷ .............................................. B02C 19/12
(52) U.S. Cl. ................... 241/79.1; 241/101.2; 241/166; 241/236
(58) Field of Search .......................... 241/81, 82, 79.1, 241/159, 236, 166, 167, 101.2

(56) References Cited

U.S. PATENT DOCUMENTS

| | | | |
|---|---|---|---|
| 5,297,742 A | * 3/1994 | Grunditz et al. | 162/4 |
| 5,352,469 A | * 10/1994 | Peters | 209/215 |
| 5,616,356 A | * 4/1997 | Buhler et al. | 241/23 |
| 5,906,793 A | * 5/1999 | Vezzani | 241/DIG. 38 |
| 5,976,594 A | * 11/1999 | LaFollette | 241/39 |
| 6,135,374 A | * 10/2000 | Hansen et al. | 241/100 |

FOREIGN PATENT DOCUMENTS

KR  172570  2/1997

OTHER PUBLICATIONS

Korean Patent Laid–Open Publication No. 1998–033544 (Jul. 25, 1998).

* cited by examiner

Primary Examiner—Mark Rosenbaum
(74) Attorney, Agent, or Firm—Finnegan, Henderson, Farabow, Garrett & Dunner, L.L.P.

(57) ABSTRACT

An automatic food waste processing system includes: a conveying apparatus for removing salt and bad odors by supplying washing water, and for facilitating withdrawal of foreign materials; a crushing apparatus for effectively crushing the food waste while separating and removing the metallic material; a drying apparatus for drying the food waste and removing bad odors during the drying process; a cutting apparatus for cutting the dried food waste into feed chips and for separately collecting sludge; and washing water removing apparatus for enabling the automatic washing of the inner portion of the system. The food waste processing including a series of different waste processes enables manufacturing of feed chips from its by-products and processing of larger amount of food waste without environmental pollution or contamination.

6 Claims, 7 Drawing Sheets

AUTOMATIC FOOD WASTE PROCESSING SYSTEM

BACKGROUND OF THE INVENTION

The present invention is related to an apparatus for enabling manufacturing of feeds or organic fertilizers from food waste, particularly, to an automatic food waste processing system for performing a series of processes, including conveying, crushing or smashing, drying, and cutting the food waste, and removing alien substances and bad odors from the food waste, as well as automatically washing the system and enabling by-products obtained therefrom to be manufactured as feeds or organic fertilizers.

A food waste processing system is generally classified into: a microorganism processing method for ripening or fermenting the food wastes through cultivation of bacteria; and a physical processing method for mechanically crushing or smashing and drying the food waste.

The microorganism processing method has disadvantages in that microorganisms must be separately cultivated and, after throwing them into the food wastes, their growth environment is prepared. Further, it takes a relative long time for the fermentation of the food waste. Particularly, the microorganism processing method has a limitation to a permitted amount of the food waste to be processed because it is impossible to process more than the amount processable by the limited amount of cultivated microorganisms.

On the other hand, the physical processing method has been devoted to the technical development of crushing, compressing, and drying food wastes. Therefore, some degree of improvement in the food waste processing was accomplished, but most of the conventional physical apparatuses failed to process food wastes effectively.

A conventional physical processing apparatus has several problems due to its own properties as follows.

1. Lack of Countermeasures Against Processing Various Food Wastes

Although a physical processing apparatus should be able to process food wastes of hard materials, such as bones and tough fibroid materials (e.g., vegetables), its processing capability was substantially inclined to ignore various technical problems. For example, when the food waste with high viscosity, such as wet boiled rice leftover, is thrown into a crusher or a masher, it causes the apparatus to malfunction due to high viscosity of the wet boiled rice leftover. In addition, it is difficult to sort out various substances contained in the food waste during in the crushing process.

2. Lack of Consideration Regarding Foreign Substances in the Food Waste

A conventional physical processing apparatus did not adequately consider the possibilities that metallic materials, such as spoons and chopsticks, and non-metallic materials, such as vinyl polymers and plastics, may be included in the food waste. Therefore, it becomes apparent in the conventional physical processing apparatus that the foreign substances contained in the food waste without prior checking may cause the system to breakdown or damage.

3. Lack of Consideration Regarding Removal of Bad Odors

A conventional physical processing apparatus did not adequately consider the technology relating to removal of bad odors generated during the food waste processing. While most of the food waste composed of organic matters usually possesses inherent bad odors and releases the bad odor as time elapses or during crushing or smashing process, the prior art failed to remove the bad odor from the food waste.

4. Failure to Recognize a Need for Clean Maintenance During and After Use

A conventional physical processing apparatus has failed to recognize the need for clean maintenance during and after the use of physical processing apparatus. Since the physical processing apparatus for food waste is likely to be considered as unsanitary anyway, it only needs to clean the inner portion of the physical processing apparatus, together with its parts disassembled for keeping its good sanitary condition. For example, Korean Patent Publication No. 97-5419 (Korean Patent No. 172,570) discloses a food waste processing apparatus in which food waste is crushed into an uniform size while passing through the first and second crushing stages, materials of a higher specific gravity are deposited at the bottom of a storage container, and the crushed food waste is then dehydrated through the first and second stages and simultaneously compressed. At that time, the generated wastewater and sludge are finally stored in a separate storage container.

While this patent discloses steps of crushing, compressing, and dehydrating, it fails to disclose the steps of processing, drying, and deodorizing the food waste and cleaning the system. Particularly, the patent fails to provide a method for removing foreign substances, such as metals and woods, from the food waste.

Another automatic food waste processing apparatus is disclosed in Korean Patent Laid-Open Publication No. 98-33544. The apparatus comprises steps of loading, crushing, compressing, and dehydrating food waste, and discharging by-products of the food waste. The technical contents are discussed below.

Figure 7:
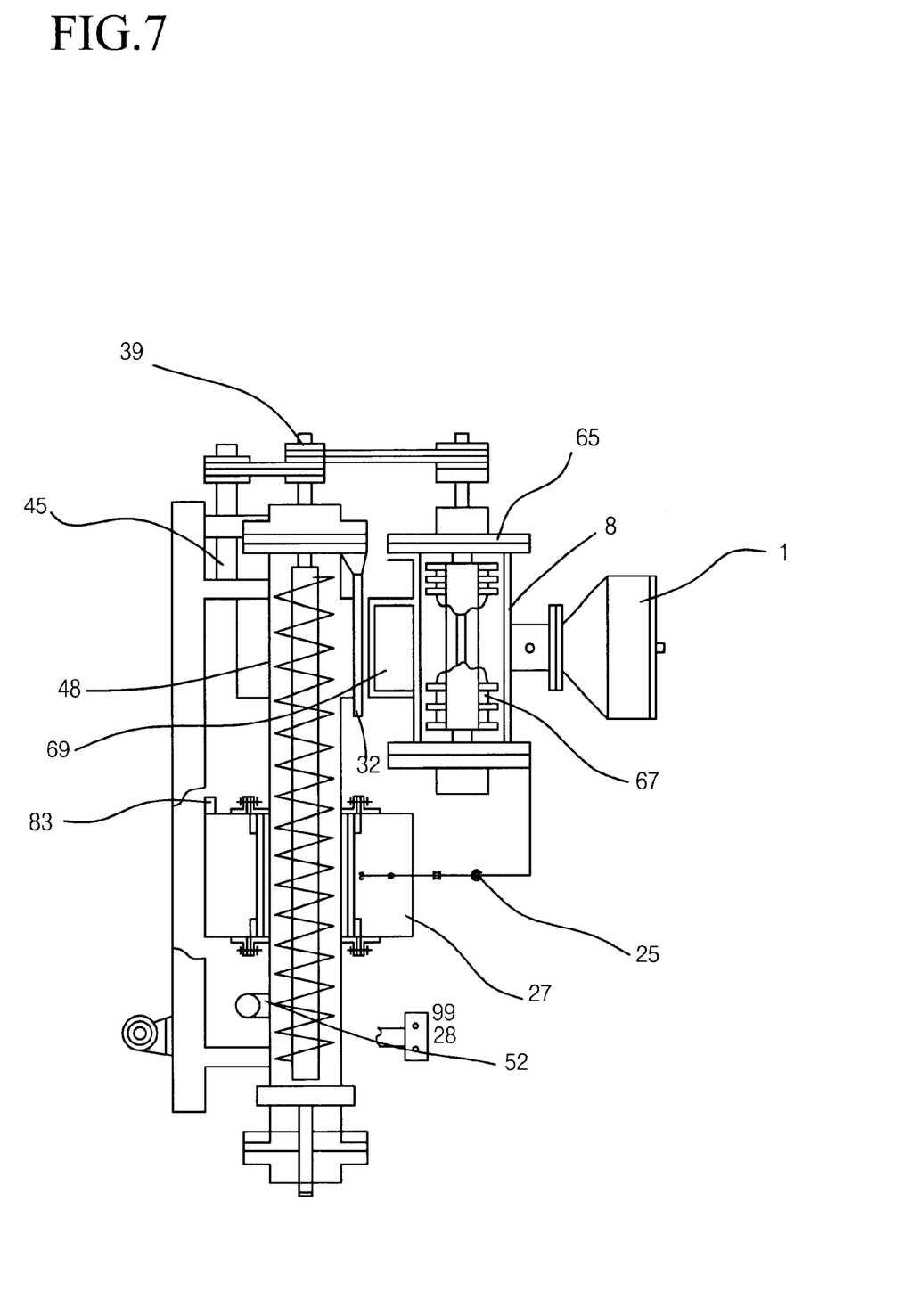
FIG. 7 is a sectional view showing a food waste processing apparatus of a prior art.

As shown in FIG. 7, the food waste is loaded into a hopper 1. A crusher 8 is positioned below the hopper 1 to crush the food waste passing through a return cover 69 with a rotary cutters 65 and a space ring 67 assembled thereinto. Thereafter, the crushed food waste is dropped down into a compressor 48. The compressor 48 is provided with a shaft 39 on which a conveyer screw is integrally mounted to convey the food waste. The return cover 69 is mounted on the crusher 8 to permit a predetermined size of the food waste to pass through and to be introduced into the crusher 8.

On the other hand, the food waste: not passing through the return cover 69 is re-circulated in the crusher 8 for crushing, or if the food wastes, such as meaty materials and fibroid materials, are piled up on the return cover 69, they are crushed again or forcibly drawn out of the crusher 8 with a water supply. The compressor 48 includes a dehydrating regulator (not shown) mounted on the discharging outlet 52 to control its inner pressure, whereby, the food waste is dehydrated and then discharged through the discharging outlet 52. The water waste is then discharged through a drain 83 into a sewer system. Also, the compressor 48 is provided with a cleaning device.

Further, the automatic food waste processing apparatus comprises an overload detecting device 99 to perform failsafe function of the system when foreign substances, such as metal spoons and metal forks, cause an impediment against the operation of the crusher 8 and/or the compressor 48. In that case, a reverse-rotation button for a motor 45 provided in a control panel 28 is pushed to remove the foreign substances from the crusher 8 and the compressor 48. After the processing of the food waste, a cleaning device 27 opens a valve 25 and operates a plurality of spray nozzles related thereto, so that the water jets cleans the inner portions of the hopper 1, the crusher 8, and the compressor 48. A valve 25 is operated to allow washing water to be poured into the system, so that the cleaning and the removal of bad odors can be somewhat accomplished.

However, the automatic food waste processing apparatus permits removal of the foreign substances of metal materials jammed in the system only by manual operation. Further, crushing process of the food waste and/or the removal of the bad odors requires water, in which the used water is subject to sewage-disposal and environmental pollution.

Furthermore, since the automatic food waste processing apparatus focuses especially on the crushing and dehydrating processes, it is inevitable that the processed food waste contains water to some degree. This means that the processed food waste must be ultimately reprocessed through additional drying, fermentation, or freezing for its storage. As a result, it cannot be considered that the above-discussed automatic food waste apparatus processes the food waste efficiently.

Therefore, it is very preferable if the food waste is efficiently and automatically processed in a one-stop routine without requiring additional processes, which immediately enables manufacturing of feeds from the processed food waste.

An object of the present invention is to provide an automatic food waste processing system for efficiently and automatically processing food waste through a series of processes and, thereby, enabling manufacturing of feeds from the processed food waste.

Another object of the present invention is to provide an automatic food waste processing system for efficiently and automatically processing wastes food waste through a series of processes, including steps of conveying, crushing or smashing, drying, and cutting the food waste, removing foreign substances, washing the system, and enabling manufacturing of feeds or organic fertilizers from the by-products of the processed food waste.

Another object of the present invention is to provide an automatic food waste processing system for sorting and removing metal: materials, such as spoons or chopsticks, and non-metal materials, such as vinyl polymers and plastics, during the processing of the food waste.

Still, another object of the present invention is to provide an automatic food waste processing system for removing sludge and bad odors during the processing of food waste through a series of processes, and washing the system to maintain a sanitary condition when stopped.

SUMMARY OF THE INVENTION

Accordingly, an automatic food waste processing apparatus comprises a hopper for introducing food waste; a conveying apparatus connected to the hopper and including: a conveyer housing; a plurality of shower units coupled to upper and lower portions of the hopper; a pair of conveyer screws for conveying the food waste introduced into the hopper; a salt sensor and a water level sensor mounted on a predetermined position in the conveyer housing to detect salt concentration and water level of the food waste; and a discharger mounted at a bottom of the housing to automatically discharge water according to the water level and the salt concentration of the food waste; a crushing apparatus including: a crusher housing; a crusher having a crush roller and vertically mounted in the crusher housing to crush the food waste conveyed from the conveying apparatus; at least one remover arranged in the crusher housing to remove residue jammed between gears of the crushing roller; a separator connected to a power source for detecting and removing metallic materials; a sensor mounted at an upper portion of the crusher housing for determining an amount of the food waste; and at least one pair of shower nozzles separately arranged at a predetermined location in the housing; a drying apparatus including: a dryer housing having an insulating material on an outer surface; a cylinder having a heater and mounted to the dryer housing; a pair of conveyer screws configured to rotate in a direction appositive to each other to convey the food waste from the crushing apparatus and to remove moisture contained therein, wherein a pitch of the conveyer screw is relatively wider adjacent to an inlet portion and gradually narrowed toward an outlet portion; and a center shaft of the conveyer screw includes a heater rod inserted thereinto; a cutting apparatus mounted adjacent to the drying apparatus and including at least one cutting blade rotating at a higher speed than that of the conveyer screw, the cutting blade cutting dried food waste into chips having a predetermined size; a first chip conveying apparatus connected to the drying apparatus for conveying the dried chips to a second chip conveying apparatus, the first chip conveying apparatus capable of being reverse-rotated to prevent sludge introduction thereinto, the second chip conveying apparatus mounted adjacent to the outlet portion of the first chip conveying apparatus to facilitate the collection of the dried chips; a washing water removing apparatus including: a housing having an upper housing and a lower housing; the upper housing with one end portion communicating with the dryer housing, the middle portion of the upper housing communicating with the crusher housing, and the other end portion of the upper housing communicating with a drain pipe; a pair of conveyer screws in the upper housing; and the lower housing having one end portion communicated with a lower portion of the upper housing, an evaporator mounted to the lower housing, a conveyer mounted to the other end portion of the lower housing; and a sludge conveying apparatus mounted adjacent to the housing of the water washing removal apparatus to facilitate the collection of sludge.

Therefore, the present invention automatically processes food waste, including removing salt, drying, and removing bad odors, cutting the waste into little chips to enable manufacturing of feeds, and separating the sludge from the chips for their collection. It is noted that the present invention is affiliated with the natural environment by drying most of the moisture generated in the system and enables the automatic cleaning of the system.

BRIEF DESCRIPTION OF THE DRAWINGS

The present invention now will be described in detail with reference to the accompanying drawings, in which.

DETAILED DESCRIPTION OF THE INVENTION

Figure 1:
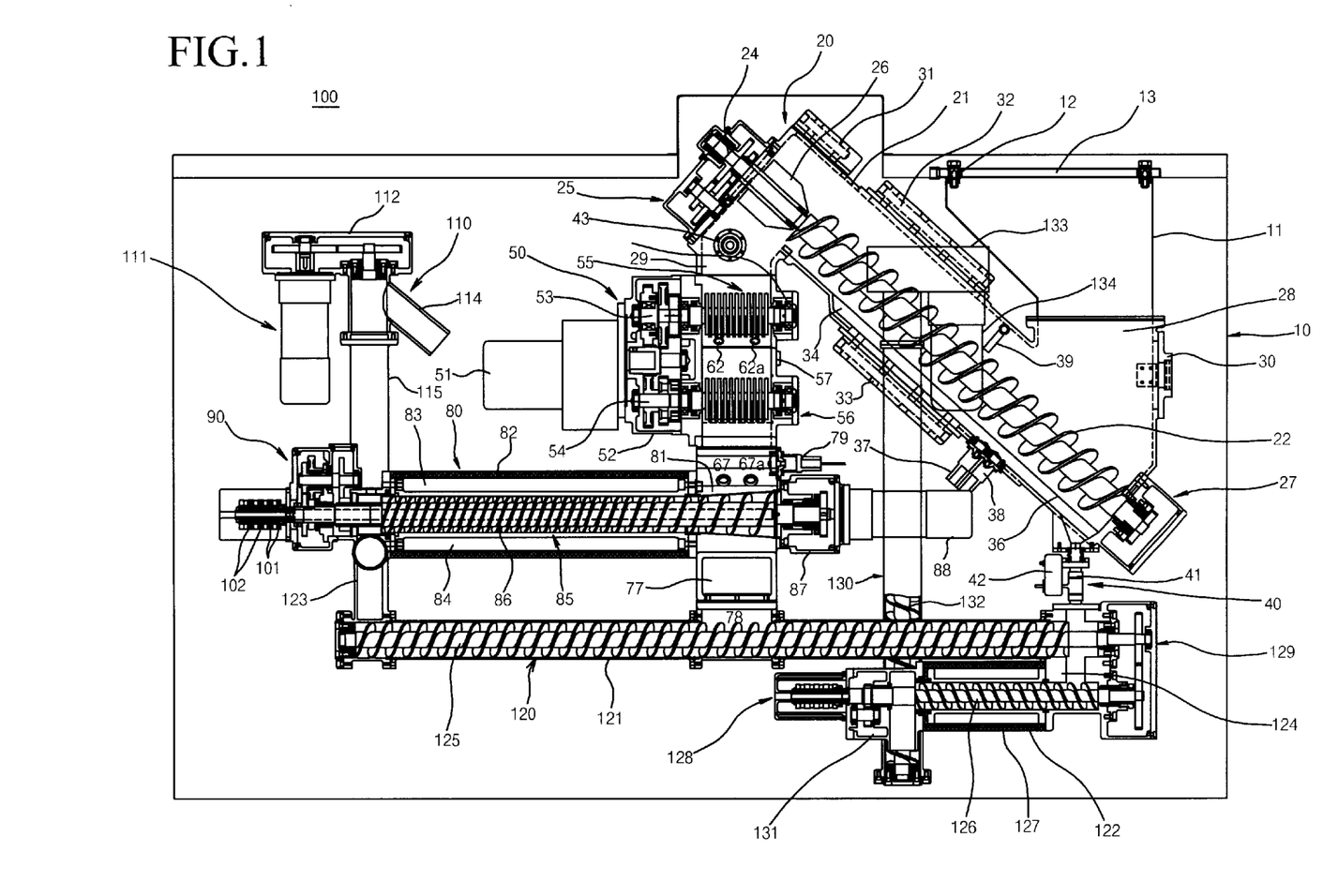
FIG. 1 is a side sectional view showing an automatic food waste processing system according to an embodiment of the present invention.
Figure 2:
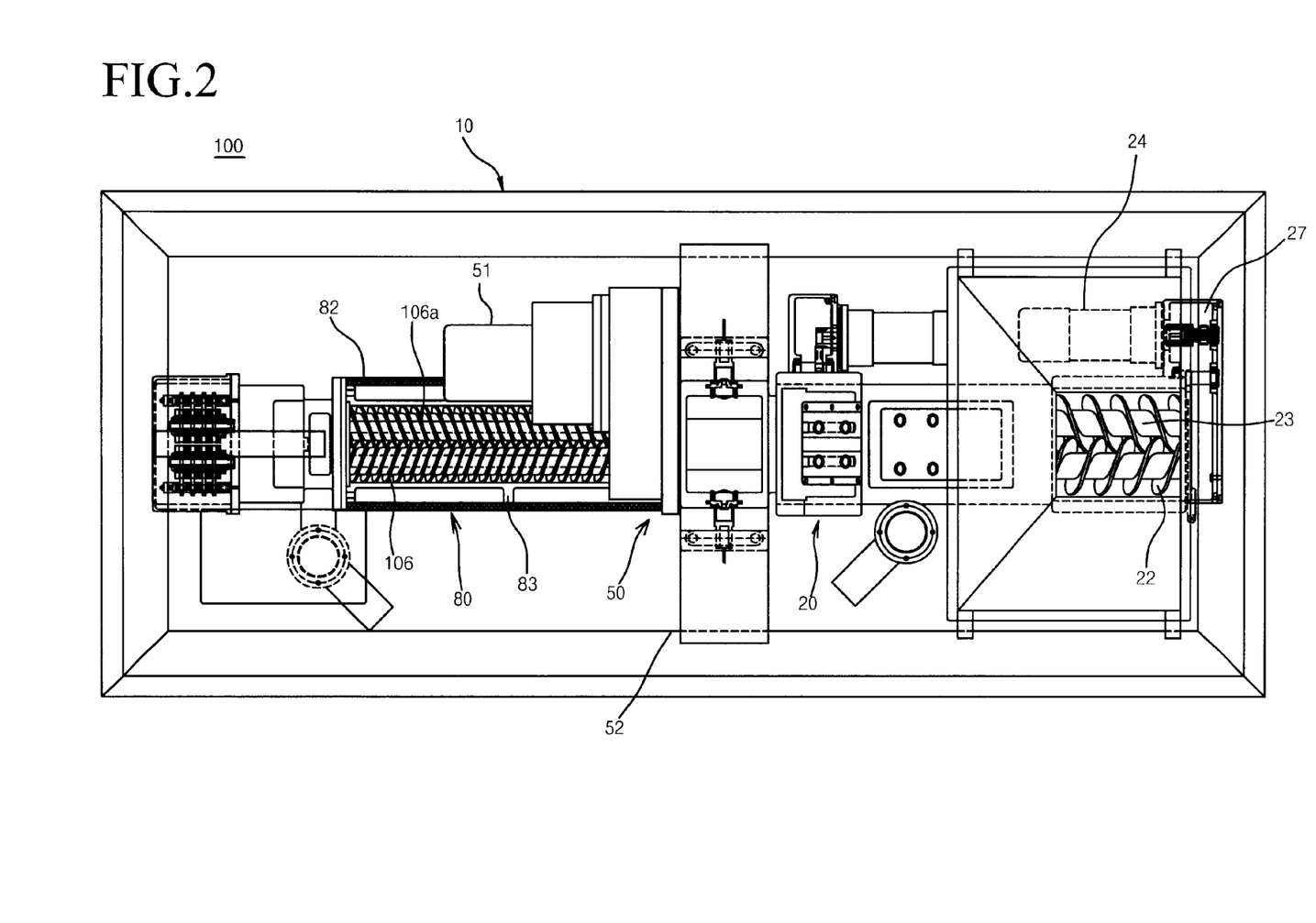
FIG. 2 is a top sectional view showing an automatic food wastes processing system according to an embodiment of the present invention.

The present invention comprises an automatic food waste processing apparatus 100 formed as a single unit and mounted in a housing 10. As shown in FIG. 1 and FIG. 2, the apparatus 100 integrally assembled in a housing 10 automatically performs a series of processes including conveying, crushing, drying, and shearing or cutting of the food waste. The processes also include cleaning the apparatus 100, removing bad odors, and manufacturing chips from by-products for feeds.

A conveying apparatus 20 includes a cylindrical body 21. obliquely mounted in the housing 10, in which a pair of conveyer screws 22 and 23 are arranged in the body 21. The first conveyer screw 22 is connected through a propeller 26 to the power shaft of a gear box 25 having a motor 24 and a plurality of gears which are positioned in the upper portion of the body 21. The second conveyer screw 23 is shafted to a decelerator 27 having a plurality of gears mounted in the lower portion of the body 21, thereby to receive a power from the first conveyer screw 22. The first and second conveyer screws 22 and 23, formed of a left-handed screw and a right-handed screw, respectively, are engaged with each other to smoothly convey the food waste, as shown in FIG. 2.

The body 21 includes an inlet portion 28 having a predetermined width at a predetermined height from its lower portion adjacent to the decelerator 27 to properly mount a hopper 11 thereon, so that the food waste is introduced thereinto, and an outlet portion 29 formed adjacent to the propeller 26 to discharge the food waste from the body 21.

The hopper 11 is fixed at the upper end portion of the housing 10 and includes at least two shower nozzles 12 properly mounted on a cover 13. The shower nozzle 12 supplies water to the introduced food waste to partially remove salt and bad odors, to deposit pieces of broken glass and chinaware having a greater specific gravity at the bottom of the housing 21, and to float pieces of woods having a lower specific gravity, thereby. enabling them to be removed through a door 30 adjacent to the inlet portion 28.

The body 21 also includes shower units 31 and 32 provided with pipes connected to a water service. The shower units 31 and 32 further includes shower nozzles mounted on the outer upper portion of the body 21 for jetting the water. Similarly, another shower unit 33 includes shower nozzles mounted on the outer lower portion of the body 21 and pipes connected to a water service for jetting water into the body 21. An enlarging portion 34 is formed as a groove having a predetermined width or extended downward along the diametric line adjacent to the inlet portion 28 on the inner lower portion of the body 21. A draining plate 36 is mounted on the enlarging portion 34 and includes a plurality of holes to supply a larger amount of water into the body 21 by shower nozzles. Water level sensors 37 and 38 are fixed to a position adjacent to the shower unit 33 in order to detect the water level in the body 21. Any one of the water level sensors 37 and 38 can be substituted with a salt concentration sensor, for example, to supply water to maintain a predetermined salt concentration and remove the salt of chips that are a final by-product by the present invention.

Additionally, metal removing plate 39 of a suspension-type is fixed proximate to the center of the paired conveyer screws 22 and 23 in a curtain-shaped configuration to limit the amount of food waste to be conveyed and to block further advancement of larger sized foreign substances, such as metals or woods, thereby forcing them to be removed. A discharger 40 is mounted adjacent to the decelerator 27 on the lower portion of the body 21 and includes a drain pipe 41 connected between a drain hole formed on the lower bottom of the body 21 and an inlet port of a sludge removing apparatus as described below in detail. An electronic valve 42 is mounted in the middle portion of the drainpipe 41 to control the water level in the body 21. A sensor 43 is mounted adjacent to the outlet portion 29 to detect a processing amount of the food waste, thereby preventing excessive amount of the food waste to pass therethrough. It means that the conveyer screws 22 and 23 are controlled by the detecting signal of the food waste processing amount sensor 43.

A crushing apparatus 50 crushes the food waste twice and separates metal materials such as spoons and chopsticks from the food waste to remove and collect them separately. The crushing apparatus 50 comprises a power generating motor 51, and a power transmitter 52 including paired connecting shafts 53 and 54 mounted in an up and down arrangement and having gears formed on the circumference of the shafts to be engaged with each other. The crushing apparatus 50 also includes a crusher 55 mounted on shafts extended from the connecting shaft 53 to crush the food waste, and a separator 56 mounted on shafts extended from the connecting shaft 54 to crush the food waste and to remove foreign substances, such as metal. The crusher 55 and the separator 56 are mounted in a housing 57, each of the paired gear groups of which are arranged to face against each other with a predetermined width and shape. The housing 57 is formed such that the lower space for mounting the separator 56 is wider than the upper space for mounting the crusher 55.

Figure 3:
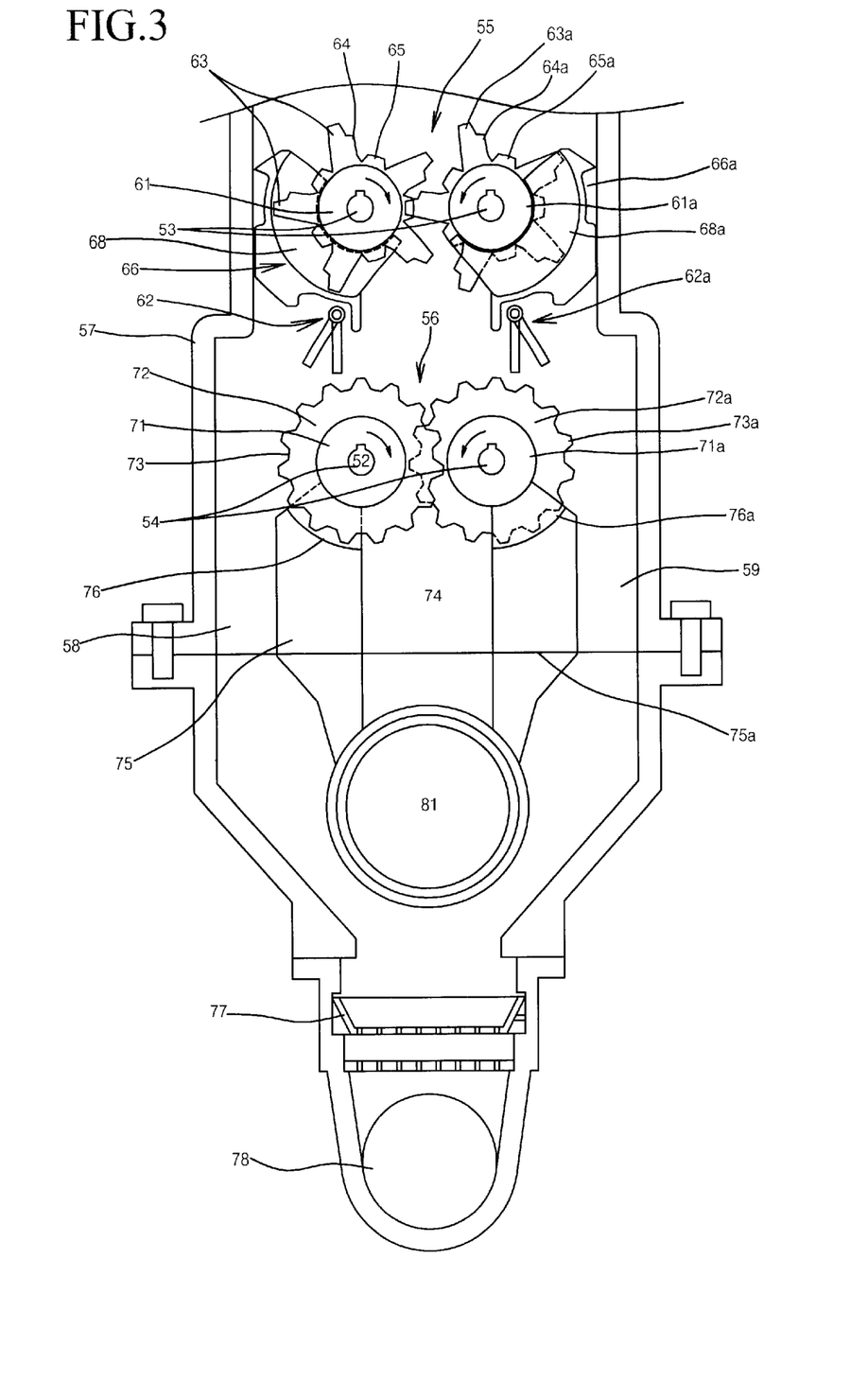
FIG. 3 is a side sectional view showing a crushing apparatus viewed/cut from one side of an automatic food wastes processing system of FIG. 1, according to an embodiment of the present invention.

As shown in FIG. 3, the crusher 55 includes a pair of first crushing rollers 61 and 61a fixed to pair connecting shafts 53. The first crushing rollers 61 and 61a are the same configuration as those of the first crushing rollers disclosed in the specification of Korean Patent Application No. 98-19099 filed by the same applicant. The first crushing rollers 61 and 61a crush a larger bone into a predetermined smaller size and further tear or cut stems and leafs, such as of vegetables, and even tougher materials, such as vinyl polymers like scissors. Namely, the first crushing rollers 61 and 61a includes gear groups formed around their circumferences that are spaced apart at predetermined intervals from each another, in which each gear group includes two kinds of teeth. First teeth 63 and 63a on each gear forms a wider tooth space therebetween, on one side of which shoulders 64 and 64a are formed in a step to stagger against each other to function as scissors. Second teeth 65 and 65a are respectively arranged between teeth 63 and 63a to stagger against the shoulders 64 and 64a so as to cooperate with the teeth 63 and 63a and cut the food waste into a predetermined size. However, if only the paired crushing rollers 61 and 61a are used, it may leave residue between the first teeth 63 and the second teeth 65a or between the first teeth 63a and the second teeth 65 during the crushing of the food waste, for which the system performance deterioration occurs.

Therefore, according to the present invention, the crusher 55 includes first removers 66 and 66a each mounted adjacent to the housing 57 to remove the residue jammed between the crushing rollers 61 and 61a. The first removers 66 and 66a each includes blades 68 and 68a provided at positions not to disturb the operation of the first and second teeth 63, 63a, 65 and 65a, in which the blades 68 and 68a are inserted into the teeth spaces transversely arranged between the first teeth 63, 63a and the second teeth 65, 65a from the circumferential semi-circular position of the lower portion to a predetermined position adjacent to the upper portion to be slidably contacted with the first crushing rollers 61 and 61a.

The separator 56 is mounted on a wider space of the housing 57 below the first crusher 55. On both sides of the crusher, withdrawal passages 58 and 59 are formed to collect metal materials, such as spoons or chopsticks. The separator 56 includes a pair of second crushing rollers 71 and 71a fixed to paired connecting shafts 54 and a plurality of circular plates 72 and 72a separately integrated with the crushing rollers 71 and 71a and spaced away at a predetermined interval from one another. Each of the circular plates 72 and 72a includes first and second teeth 73 and 73a of a spear gear in the form of a ladder. Therefore, the second crushing rollers 71 and 71 a are positioned closely below the first crushing rollers 61 and 61a, so that the food waste crushed by the first crushing roller 61 and 61a is introduced between the first and second teeth 73 and 73a to cut and press tough materials, such as scissors, and hard materials, such as bones, and breaking them into smaller pieces. However, if only the paired crushing rollers 71 and 71a are used, it may leave residue between the first and second teeth 73 and 73a during the crushing process, for which the system performance deteriorates.

According to the present invention, the separator 56 also includes second removers 75 and 75a each mounted between a guide hole 81 and the second crushing rollers 71 and 71a to form a guide passage 74 for guiding the food waste to be dried. The second removers 75 and 75a respectively include blades 76 and 76a similar to the blades 68 and 68a which are positioned into the teeth spaces transversely arranged between a plurality of circular plates 72 and 72a which are slidably contacted with the circumferential semi-circular portion of the lower portion and extended outward at an approximately 45° therefrom. In addition, the second crushing rollers 73 and 73a are each applied to a different electrode of a direct current power source, such that, if a metal piece is caught between the circular plates 73 and 73a, the connecting shafts 54 are simultaneously reverse-rotated to pick out and throw the metal piece into any one of the withdrawal passages 58 and 59, thereby collecting it at a receiving box 77.

Additionally, shower nozzles 67 and 67a are mounted immediately below the first remover 62 and 62a to clean the inner portion of the housing 57. Shower nozzles 67 and 67a are mounted immediately below the second removers 75 and 75a to wash a drying apparatus 80 together with nozzle pipes as described below (referring to FIG. 1). A water guiding hole 78 is formed at the bottom of the housing 57 to introduce washing water supplied from the shower nozzles used to clean the inner portion of the housing 57 or dropping water generated due to excessive moisture contained in the food waste into a washing water removing apparatus or drying apparatus 80. A sensor 79 is mounted over the guide hole 81 for detecting and controlling the amount of food waste to be supplied into the guide hole 81 (referring to FIG. 1). It means that a signal generated by the sensor 79 is received by a system control (not shown) to control the operation of the conveyer screws 22 and 23.

Referring to FIG. 1, the drying apparatus 80 comprises a housing 82 laterally extended with respect to the housing 57 and a cylindrical chamber 83 surrounded by the inner circumference of the housing 82. A heater 84 electrically connected to an external power source is mounted to the cylindrical chamber 83. The cylindrical chamber 83 may be used as a gas combustion chamber in order to maintain a predetermined temperature in the housing 82. A pair of drying conveyer screws 85 and 85a is horizontally mounted in the housing 82. Heater rods 86 having the same length as that of the conveyer screws 85 and 85a are respectively inserted into the conveyer screws 85 and 85a to heat the conveyer screws 85 and 85a and dry the food waste in the housing 82 with the heat from the cylinder chamber 83. A decelerator 87 including a gear box and a motor 88 are mounted in order on the external side surface of the housing 82 to rotate the conveyer screws 85 and 85a at a predetermined speed. Therefore, most of the wood or vinyl polymers in small pieces contained in the food waste can be removed in the process of the drying/conveying process. Also, the conveyer screws 85 and 85a are configured to have a relative wider pitch adjacent to the water guiding hole 78. Closer to the exit of the housing 82, the pitch becomes narrower until a predetermined length, and then the pitch remains at the predetermined pitch for the remainder portion thereof. It means that the conveyer screws 85 and 85a compress and/or dry the food waste by their pitch structures. The dried food waste is cut into chips of a predetermined size so as to enable the chips to be used for feeds.

Figure 4:
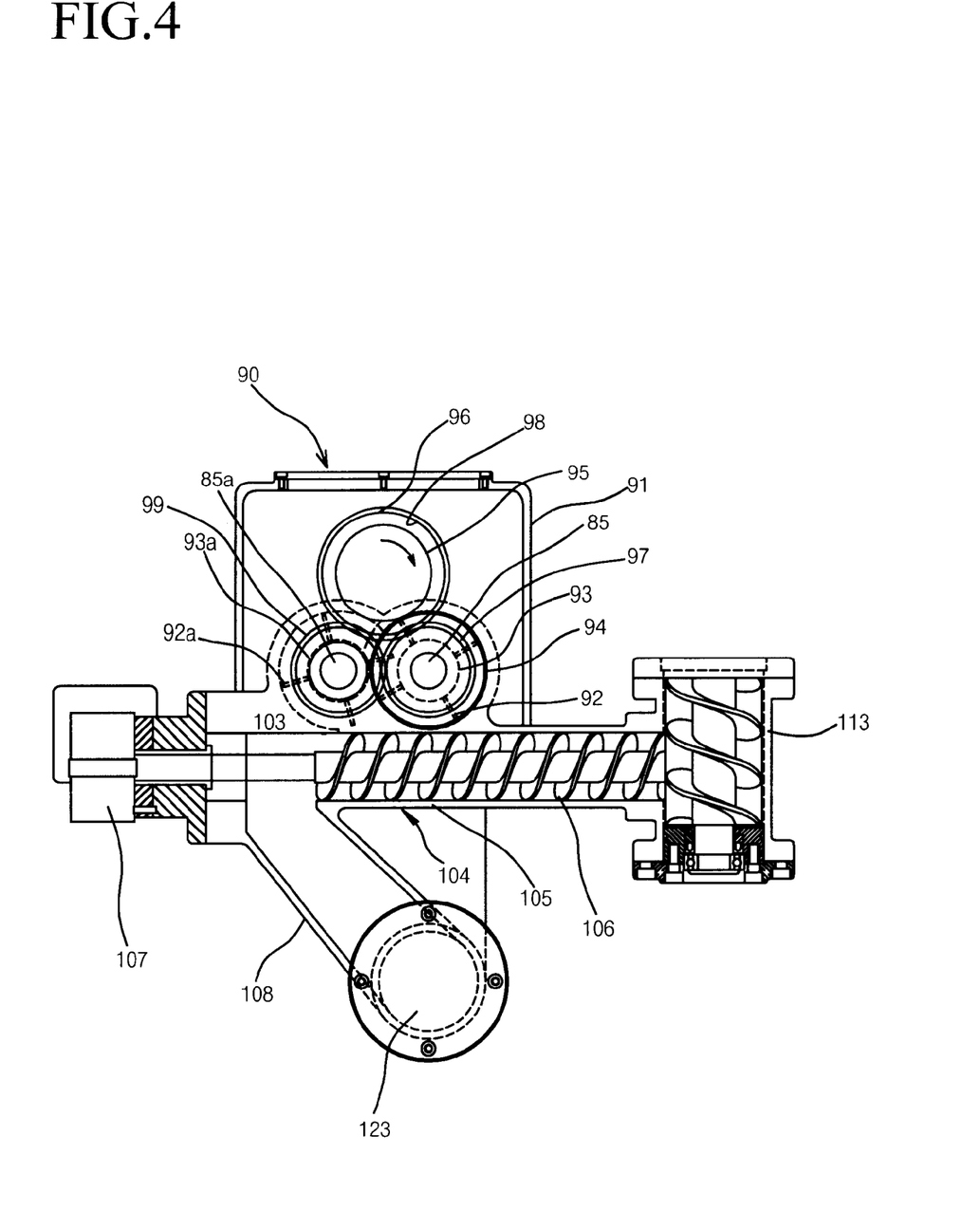
FIG. 4 is a side sectional view of a cutting apparatus, showing its relationship with peripheral parts, viewed from one side of the automatic food waste processing system of FIG. 1, according to an embodiment of the present invention.
Figure 5:
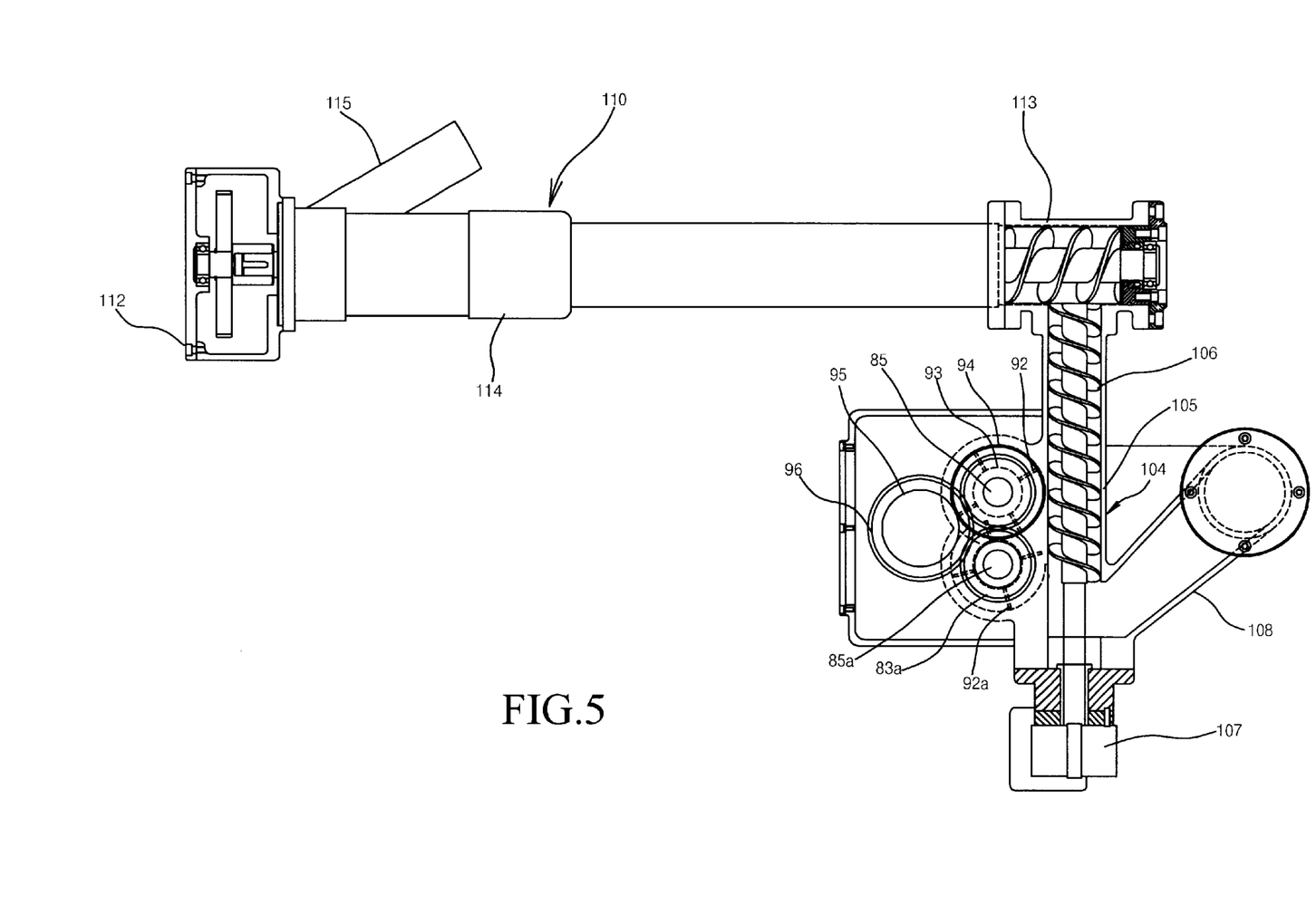
FIG. 5 is a side sectional view of a cutting apparatus, showing its relationship with a convey screw for chips, viewed from one side of the automatic food waste processing system of FIG. 1, according to an embodiment of the present invention.
Figure 6:
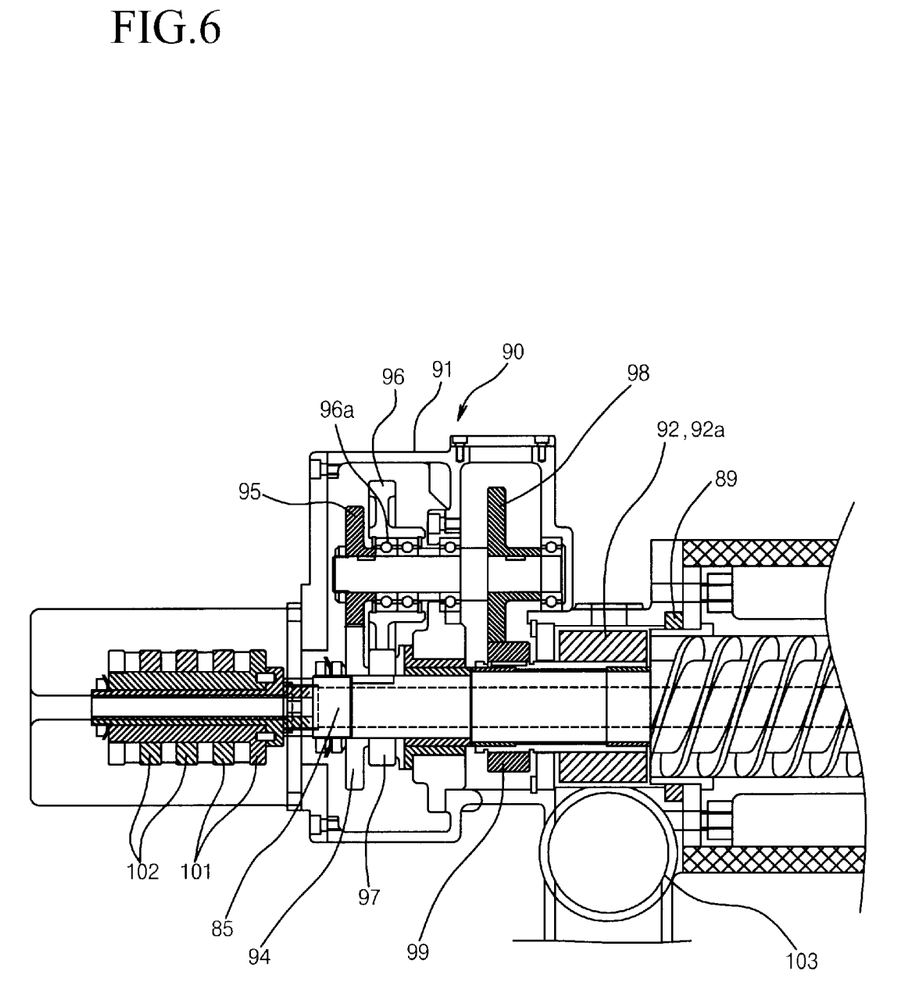
FIG. 6 is a side sectional view of a cutting apparatus, showing its relationship with peripheral parts, viewed from one side of the automatic food waste processing system of FIG. 1, according to an embodiment of the present invention.

As shown in FIGS. 4, 5 and 6, a cutting apparatus 90 comprises a housing 91 coupled to the housing 82 with heat-insulating by means of an insulating plate 89. The shafts of the conveyer screws 85 and 85a extends through the housing 91. Cutting blades 92 and 92a are mounted on the shafts adjacent to the conveyer screws 85 and 85a, respectively, to be rotated by gear rotating plates 93 and 93a and cut the food waste into chips. In other words, the gear rotating plates 93 and 93a are linked with several other gears to be rotated at a higher speed than that of the conveyer screws 85 and 85a in a direction appositive to each other. A first gear 94 is shafted to the end of the shaft extended to the farthest away from the conveyer screws 85 and 85a. The first gear 94 is engaged with a second gear 95 on the upper portion thereof. The second gear 95 includes an idler 96 mounted on the same shaft adjacent thereto to be rotated by a bearing 96a. The idler 96 is idly rotated in contact with the rotating plate 97 of the conveyer screws 85 and 85a. An impeller 98 is mounted on the same shaft next to the back surface of the idler 96 to rotate a second rotating gear 95. In this way, as the gear rotating plates 93 and 93a rotate, the cutting blades 92 and 92a are rotated in a direction opposite to each other.

On the other hand, temperature sensors 102, such as thermostats or thermocouples, are mounted on the end portion of the drying conveyer screws 85 and 85a to detect the temperature of a brush 101 and the heater rods 86 to control the temperature of the heater rods 86 by a system control. The brush 101 is an electrical power terminal to apply the power source to the heater rod 86. An inlet hole 103 is formed immediately below the cutting blades 92 and 92a to permit the chips out of the cutting blades 92 and 92a to be passed therethrough.

A chip conveying apparatus 104 includes a housing 105 mounted right below the inlet hole 103, in which a conveyer screw 106 is mounted. The conveyer screw 106 conveys the chips leftward in FIG. 5 and is shafted to a motor 107 to supply the chips to a second conveying apparatus 110. On the contrary, during washing operation of the system, the conveyer screw 106 is reverse-rotated to prevent introduction of water passed through the drying apparatus 80 into the second chip conveying apparatus 110.

As shown in FIGS. 1, 5, and 6, the second chip conveying apparatus 110 comprises a housing 114 vertically arranged, on the top portion of which a decelerator 112 is mounted along with a power motor 111. A conveyer screw 113 is mounted in the housing 114. The housing 114 is communicated at the lower portion with the housing 105 of the first conveyer 104 and includes a chip discharging port formed adjacent to the upper portion. A guide portion 115 is connected to the chip discharging port to enable the chips to be collected into a burlap bag. A water passage 108 is connected at one end to the left lower portion of the housing 105 to pass washing water through and at the other end to the washing water removing apparatus 120, as shown in FIG. 1.

The washing water removing apparatus 120 comprises an upper housing 121 and a lower housing 122 doubly arranged to each other. The housing 121 includes a washing water inlet port 123 formed on the left end portion, a hole communicated with the water guiding hole 78 at the middle portion, and a communicating port 124 formed on the right lower portion. The water drainpipe 41 connected to the electronic valve 42 is fixed to the right upper portion of the housing 121 as described above.

Conveyer screws 125 and 126 are respectively mounted in the housings 121 and 122, in which a heater rod is provided. Further, an evaporator 127 is mounted adjacent to the inner surface of the housing 122. The evaporation 127 may be a combustion apparatus using gas or fossil fuel. The conveyer screws 125 and 126 are coupled to a decelerator 129 to be rotated at the same speed. A motor 128, terminals for applying the power source to the heater rods, and a temperature sensor are properly mounted to the left end portion of the conveyer screw 126 to enable the system control to evaporate the washing water.

Furthermore, the washing water removing apparatus 120 enables sludge generated during the washing of the whole system or the processing of the food waste to be conveyed by the conveyer screws 125 and 126, thereby separately disposing the sludge. In other words, as shown in FIG. 5, the sludge conveyed toward the left portion of the housing is moved to a sludge conveying apparatus 130 arranged vertically. The sludge conveying apparatus 130 comprises a housing 131, the lower portion of which is communicated with the housing 126. A vertical conveyer screw 132 is mounted in the housing 131, on the upper portion of which a decelerator 133 and a power motor 134 are mounted. A discharging passage (not shown) is fixed adjacent to the decelerator 133 to enable collection of the sludge into a burlap bag. Of course, the sludge can be discharged through a discharging port formed on the right lower portion of the housing 126. Herein, it is noted that the vertical arrangement of the chip conveying apparatus 120 and the sludge conveying apparatus 130 are aimed at enhancing the space efficiency of the system.

As described above, the automatic food waste processing system 100 is operated as follows. The food waste is placed into the hopper 11 together with water supplied from the shower nozzle 12 and conveyed upward in the cylindrical body 21 by the conveyer screws 21 and 22. At that time, the amount of water to be supplied is determined according to the water level and the salt concentration separately detected by the water level sensor 37 and the salt sensor 38. At the same time, the operation of the electronic valve 42 is controlled by a system control to determine the opening of the drain pipe 41, thereby discharging water containing the salt concentration of over a predetermined value.

Thereafter, the food waste is conveyed to the upper portion of the housing 21 by the conveyer screws 22 and 23 and effectively moved into the crushing apparatus 50 by the propeller 26. A predetermined amount of food waste determined by the food waste processing amount sensor 43 is passed through the crusher 55 and the separator 56 in turn to be crushed twice and to remove metal materials from the separator 56 and to collect in the receiving box 77. At that time, moisture and water contained in the food waste is flowed through the water-guiding hole 78 into the housing 121. In that case, the food waste processing amount sensor 79 detects an amount of the food waste supplied to the drying apparatus 80 to control the operation of the conveying apparatus 20 and the drying apparatus 80.

The drying apparatus 80 presses the food waste to remove its moisture content with the conveyer screws 85 and 85a, dries the food waste with the heater 84 and the heater rod 86, conveys the food waste to the cutting apparatus 90. The cutting blades 92 and 92a of the cutting apparatus 90 cuts the food waste into chips of a size that is determined by a clearance formed between the blade and the discharging outlet of the drying apparatus 80. The chips are supplied to the first conveyer 104 and then to the second chip conveying apparatus 110 to be collected in a burlap bag.

During the series of processes for chip manufacturing, the water and a small amount of sludge contained in the water passing through the water guiding hole 78 of the housing 57, as well as the water containing rich salt and a small amount of sludge passing through the discharging pipe 41, are dried at the same time. The moisture is removed from the sludge and the sludge is then conveyed by the conveyer screws 125 and 126 to the sludge conveying apparatus 130 to be collected into a burlap bag.

On the other hand, upon washing the automatic food waste processing system 100, the shower units 31, 32 and 33 mounted inside of the upper and lower portions of the housing 21 are operated, while the shower nozzles 12 and 13 are opened to clean not only the hopper 11 but also the conveyer screws 22 and 23. At that time, the residue of the food waste in the housing 21 is introduced into the housing 57 by the conveyer screws 22 and 23, and the drain pipe 41 is opened according to the water level detected by the sensor 38 to flow the washing water into the washing water removing apparatus 120 to be evaporated by the heater rod and the evaporator 127. The residual food waste is crushed twice passing through the crusher 56 and the separator 57 and then guided into the drying apparatus 80. At the same time, the washing water from the paired shower nozzles 62, 62a and 67, 67a washes the inner portion of the housing 57 and then is flowed into the washing water removing apparatus 120 through the water guiding hole 78 of the housing 57. In that case, the washing water is not only evaporated or dried at a predetermined temperature by the heater rod and the evaporator 127, but also the sludge is dried and conveyed into the sludge conveying apparatus 130 for collection.

Furthermore, a part of the washing water is flowed into the drying apparatus and dried. At that time, the conveyer screws 105 and 105a of the chip conveying apparatus 104 are reverse-rotated to supply the residual food waste to the upper and lower housings 121 and 122 along with the washing water in order, so that the washing water is fully evaporated, and the sludge is dried and conveyed to the sludge conveying apparatus 130 for collection. Like this, after the sludge is removed, the automatic food waste processing system can be washed by only the operation of the shower units and the nozzles.

As described above, the present invention: removes salt and bad odors by the supply of washing water; effectively crushes food waste twice; separates and removes the metal material; facilitates the withdrawal of vinyl; dries the food waste; removes bad odors during the drying; cuts the dried food waste into chips to be collected for feeds; and collects the sludge, separately. More preferably, the present invention can automatically wash the inner portion of a system. Therefore, the present invention can perform a series of food waste processes to manufacture the feed chips as its by-products and enable the process of a larger amount of the foods according to its size without causing environmental pollution or contamination.

What is claimed is:

1. An automatic food waste processing system comprising:
    a hopper for introducing food waste;
    a conveying apparatus connected to the hopper and including:
        a conveyer housing;
        a plurality of shower units coupled to upper and lower portions of the hopper;
        a pair of conveyer screws for conveying the food waste introduced into the hopper;
        a salt sensor and a water level sensor mounted on a predetermined position in the conveyer housing to detect salt concentration and water level of the food waste; and
        a discharger mounted at a bottom of the housing to automatically discharge water according to the water level and the salt concentration of the food waste;
    a crushing apparatus including:
        a crusher housing;
        a crusher having a crush roller and vertically mounted in the crusher housing to crush the food waste conveyed from the conveying apparatus;
        at least one remover arranged in the crusher housing to remove residue jammed between gears of the crushing roller;
        a separator connected to a power source for detecting and removing metallic materials;
        a sensor mounted at an upper portion of the crusher housing for determining an amount of the food waste; and
        at least one pair of shower nozzles separately arranged at a predetermined location in the housing;
    a drying apparatus including:
        a dryer housing having an insulating material on an outer surface;
        a cylinder having a heater and mounted to the dryer housing;
        a pair of conveyer screws configured to rotate in a direction appositive to each other to convey the food waste from the crushing apparatus and to remove moisture contained therein, wherein a pitch of the conveyer screw is relatively wider adjacent to an inlet portion and gradually narrowed toward an outlet portion; and
        a center shaft of the conveyer screw includes a heater rod inserted thereinto;
    a cutting apparatus mounted adjacent to the drying apparatus and including at least one cutting blade rotating at a higher speed than that of the conveyer screw, the cutting blade cutting dried food waste into chips having a predetermined size;
    a first chip conveying apparatus connected to the drying apparatus for conveying the dried chips to a second chip conveying apparatus, the first chip conveying apparatus capable of being reverse-rotated to prevent sludge introduction thereinto, the second chip conveying apparatus mounted adjacent to the outlet portion of the first chip conveying apparatus to facilitate the collection of the dried chips;
    a washing water removing apparatus including:
        a housing having an upper housing and a lower housing;
        the upper housing with one end portion communicating with the dryer housing, the middle portion of the upper housing communicating with the crusher housing, and the other end portion of the upper housing communicating with a drain pipe;
        a pair of conveyer screws in the upper housing; and
        the lower housing having one end portion communicated with a lower portion of the upper housing, an evaporator mounted to the lower housing, a conveyer mounted to the other end portion of the lower housing; and
    a sludge conveying apparatus mounted adjacent to the housing of the water washing removal apparatus to facilitate the collection of sludge.

2. The automatic food waste processing system as claimed in claim 1, wherein:
    the crusher comprises a pair of crushing rollers with a plurality of first teeth and second teeth; and
    each of the remover includes blades placed such that operation of the first and second teeth is not disturbed, the blades are inserted into spaces transversely arranged between the first teeth and the second teeth.

3. The automatic food waste processing system as claimed in claim 1, wherein the separator comprises:
    a pair of crushing rollers;
    a plurality of circular plates separately integrated with the crushing rollers and spaced from one another with a predetermined interval; and
    a remover providing a guide passage for drying the food waste and providing a withdrawal passage for withdrawing metals,
    wherein a power source is applied to each of the circular plates to have a different electrical polarity the circular plates configured to remove metal piece, when the metal piece is caught between the circular plates, into the withdrawal passage, thereby collecting the metal piece in a receiving box.

4. The automatic food waste processing system as claimed in claim 1, wherein the cutting apparatus comprises:
    a gear rotating plate including the cutting blade mounted on a shaft adjacent to the conveyer screw of the drying apparatus to be rotated at the higher speed than that of the conveyer screw;
    a first gear shafted to an end of the shaft extended farthest from the conveyer screw and engaged with a second gear on an upper portion thereof, the second including an idler mounted on the same shaft to be rotated by a bearing idly rotated in contact with a rotating plate of the conveyer; and an impeller mounted on the same shaft next to the back surface of the idler to rotate a second rotating gear, whereby the rotation of the gear rotating plates causes the rotation of the cutting blades in a direction opposite to each other.

5. The automatic food waste processing system as claimed in claim 1, wherein the housing of the water washing removing apparatus includes a collecting passage connected to its lower portion instead of the sludge conveying apparatus to directly collect the sludge.

6. The automatic food waste processing system as claimed in claim 1, wherein the cylinder of the drying apparatus comprises a gas combustion chamber.

* * * * *